F. Fanning,

Wire Stretcher.

No. 101,601.  Patented Apr. 5, 1870.

Witnesses.  Inventor.
Harry King  F. Fanning
C. L. Ewert  per Alexander & Mason
  attys.

United States Patent Office.

F. FANNING, OF ATCHISON, KANSAS.

Letters Patent No. 101,601, dated April 5, 1870.

IMPROVEMENT IN WIRE-TIGHTENER FOR WIRE FENCE.

The Schedule referred to in these Letters Patent and making part of the same.

*To all whom it may concern:*

Be it known that I, F. FANNING, of Atchison, in the county of Atchison and in the State of Kansas, have invented certain new and useful Improvements in Wire-Tightener; and do hereby declare that the following is a full, clear, and exact description thereof, reference being had to the accompanying drawings and to the letters of reference marked thereon making a part of this specification.

The nature of my invention consists in the construction of a "wire-tightener" to be used in wire fences or any other places where it may be desired to stretch and tighten wires.

In order to enable others skilled in the art to which my invention appertains to make and use the same, I will now proceed to describe its construction and operation, referring to the annexed drawings, in which—

Figure 1:
Figure 2:
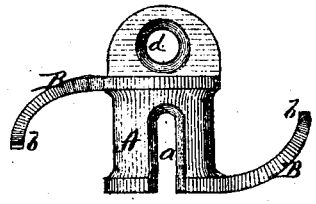

Figure 1 is a bottom view, and
Figure 2, a side view of my wire-tightener.

My tightener consists of a body, A, having a slot, $a$, extending upward a suitable distance from its bottom, and having above and below said slot a wing, B. These wings extend one to each side, and the one at the lower end of the body is curved upward, and its end forming a hook, $b$, while the wing above the slot $a$ is curved downward, and has a similar hook $b$ at its end, said hook being, however, turned in the opposite direction from the hook on the lower wing.

The upper portion of the tightener is provided with a hole, $d$, for the insertion of a stick or lever.

The operation of my tightener is very simple. The tightener is straddled on the wire, with a rod or stick in the hole $d$. It is then turned, winding the wire around the body of the tightener, and the wire caught by the hooks $b\ b$, and the tightener left on the wire.

When used on wire fences it should be slacked up somewhat in the fall, after the crops are gathered, so as to allow for the contraction of the wire in cold weather.

This tightener may be used wherever it is desired to stretch and tighten wires.

Having thus fully described my invention,
What I claim as new, and desire to secure by Letters Patent, is—

As an article of manufacture, a metallic wire-tightener made of one piece, and consisting of the body A, having a slot, $a$, in its bottom, ring $d$ on its top, and the upward and downward projecting wings B B, provided with hooks $b\ b$ on their ends, all as herein shown and described.

In testimony that I claim the foregoing, I have hereunto set my hand this 26th day of October, 1869.

F. FANNING.

Witnesses:
 D. MARTIN,
 J. L. BLISS.